(12) United States Patent
Kim

(10) Patent No.: US 9,088,720 B2
(45) Date of Patent: Jul. 21, 2015

(54) APPARATUS AND METHOD OF DISPLAYING CAMERA VIEW AREA IN PORTABLE TERMINAL

(71) Applicant: Samsung Electronics Co., Ltd., Gyeonggi-do (KR)

(72) Inventor: Min-Soo Kim, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 131 days.

(21) Appl. No.: 13/736,187

(22) Filed: Jan. 8, 2013

(65) Prior Publication Data

US 2013/0176474 A1 Jul. 11, 2013

(30) Foreign Application Priority Data

Jan. 9, 2012 (KR) .................. 10-2012-0002418

(51) Int. Cl.
*H04N 5/232* (2006.01)
*H04N 5/225* (2006.01)

(52) U.S. Cl.
CPC ......... *H04N 5/23293* (2013.01); *H04N 5/2259* (2013.01); *H04N 5/232* (2013.01); *H04N 5/23219* (2013.01)

(58) Field of Classification Search
CPC .......... H04N 5/23293; H04N 5/23219; H04N 5/2259; H04N 5/232

USPC ...................................... 348/333.01
See application file for complete search history.

(56) References Cited

U.S. PATENT DOCUMENTS

| 2006/0044399 | A1* | 3/2006 | Fredlund et al. ......... 348/207.99 |
| 2008/0080846 | A1 | 4/2008 | Grip |
| 2009/0271734 | A1* | 10/2009 | Hsu et al. ..................... 715/785 |
| 2014/0049667 | A1* | 2/2014 | Robinson et al. ............. 348/262 |
| 2014/0063052 | A1 | 3/2014 | Choi |

FOREIGN PATENT DOCUMENTS

WO 2005/071851 A1 8/2005

* cited by examiner

*Primary Examiner* — James Hannett
(74) *Attorney, Agent, or Firm* — Cha & Reiter, LLC

(57) ABSTRACT

An apparatus and a method of displaying a camera view area in a portable terminal that addresses the scenario of a viewing angle of a user taker being different from that of the camera, particularly in the case of transparent display panel. The method preferably includes: receiving a first image including a shape of a user when requesting a picture; identifying a position of the shape of the user within the first image; determining whether the identified position of the shape of the user is included in a pre-designated area; calculating a view direction and a view angle of the user by the shape of the user when the identified position of the shape of the user is not included in the pre-designated area as a result of the determination; and rotating a second camera for photographing a second image based on the calculated view direction and view angle.

16 Claims, 6 Drawing Sheets

APPARATUS AND METHOD OF DISPLAYING CAMERA VIEW AREA IN PORTABLE TERMINAL

CLAIM OF PRIORITY

This application claims priority under 35 U.S.C. §119(a) from a Korean Patent Application entitled "Apparatus and Method of Displaying Camera View Area in Portable Terminal" filed in the Korean Intellectual Property Office on Jan. 9, 2012 and assigned Serial No. 10-2012-0002418, the contents of which are incorporated herein by reference in its entirety.

BACKGROUND OF THE INVENTION

1. Field of the Invention

The present invention relates to a portable terminal with a camera function. More particularly, the present invention relates to an apparatus and a method of displaying a camera view area in a portable terminal.

2. Description of the Related Art

A transparent display panel projecting a background on a display panel has been developed according to the development of a display panel. Such a transparent display panel has different projected backgrounds according to a location of a user.

Most portable terminals generally are now equipped with an embedded camera, and the particular portable terminals that include the transparent display panel has a problem of failing to capture an image as desired by a user when photographing an object because an image captured through a camera is different from an image viewed by a user.

With reference to FIG. 1, a portable terminal typically includes a camera 105 that is attached to a rear surface of a transparent display panel 103 of the portable terminal.

When a user 101 views the transparent display panel 103 from a view direction 107, the user 101 has a perspective that may view show a subject for photography exists in a second area 111 is projected on the transparent display panel 103.

In this case, when the user 101 takes a picture typically by pressing or touching button, the camera 105 of the portable terminal photographs a first area 109, and not the second area 111 because the user's viewpoint is different from that of the camera. As described above, since an image projected on the transparent display panel 101 is different from an image photographed by the camera 105, the user 101 cannot properly photograph a desired image as there is a significant amount of offset between the image as appeared to the user and the image captured by the camera.

Accordingly, there is a need in the art for a method and apparatus capable of photographing an image desired by a user in which the camera's view is more closely aligned with the view seen by the user.

SUMMARY OF THE INVENTION

Accordingly, the present invention has been made in part to solve at least the above-stated problems occurring in the prior art, and to provide advantages as discussed herein below. The present invention provides an apparatus and a method of notifying a user that an image desired by the user is different from an image photographed by a camera by adjusting a size of the image photographed by the camera according to a view angle of the user in a portable terminal including a transparent display panel.

Also, the present invention provides an apparatus and a method of making an image desired by a user (e.g. picture taker) correspond to an image photographed by a camera by rotating the camera according to a view direction and a view angle of the user in a portable terminal including a transparent display panel.

In accordance with an exemplary aspect of the present invention, there is provided an apparatus for displaying a camera view area in a portable terminal, the apparatus preferably including: a display unit including a transparent display panel; a camera unit including a first camera for photographing a first image including a shape of a user and a rotatable second camera for photographing a second image; a controller for receiving the first image when a request for taking a picture is made from the user, identifying a position of the shape of the user within the first image, determining whether the identified position of the shape of the user is included in a pre-designated area, calculating a view direction and a view angle of the user according to the shape of the user when the identified position of the shape of the user is not included in the pre-designated area as a result of the determination, and rotating the second camera based on the calculated view direction and view angle to correspond with the view direction and angle of the user.

In accordance with another exemplary aspect of the present invention, there is provided a method of displaying a camera view area in a portable terminal, the method preferably including: receiving a first image including a shape of a user when a request for taking a picture is made by the user; identifying a position of the shape of the user within the first image; determining whether the identified position of the shape of the user is included in a pre-designated area; calculating a view direction and a view angle of the user according to the shape of the user when the identified position of the shape of the user is not included in the pre-designated area as a result of the determination; and rotating a second camera for photographing a second image based on the calculated view direction and view angle.

The portable terminal including the transparent display panel according to the present invention advantageously notifies the user that a view of an image seen by the user and desired to be captured by the camera is different from an image to be photographed or already photographed by the camera by adjusting a size of the image photographed by the camera according to the view angle of the user.

Further, the portable terminal preferably includes the transparent display panel according to the present invention has an effect of making an image desired by the user be the same (correspond within a predetermined variance in viewpoint angle and/or direction) as an image photographed by the camera by rotating the camera according to the view direction and the view angle of the user.

DETAILED DESCRIPTION

Hereinafter, the exemplary embodiments of the present invention will be described with reference to the accompanying drawings. In the following description, a detailed explanation of known related functions and constitutions may be omitted to avoid unnecessarily obscuring appreciation of the subject matter of the present invention by a person of ordinary skill in the art. An artisan should understand and appreciate that as used herein, under the broadest reasonable interpretation terms such as "unit" and "module" are statutory references to hardware that may or may not be loaded with software or firmware for operation.

A portable terminal according to an exemplary embodiment of the present invention generally refers to an easily portable electronic device that is often but not necessarily a handheld device, and includes a video phone, a mobile phone, a smart phone, an International Mobile Telecommunication (IMT)-2000 terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book, a portable computer (notebook computer and a tablet computer) or a digital camera. The present invention, as defined by the scope of the appended claims is not limited by the aforementioned examples, as other types of electronic devices can utilize the method and apparatus of displaying a camera view, FIG. 2 is a block diagram illustrating the portable terminal according to the embodiment of the present invention.

Figure 1:
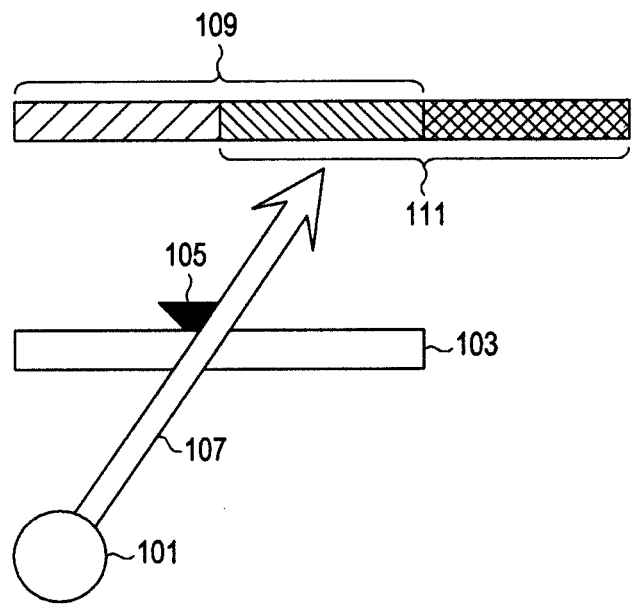
FIG. 1 is a diagram illustrating a camera view area of a portable terminal according to a conventional art.
Figure 2:
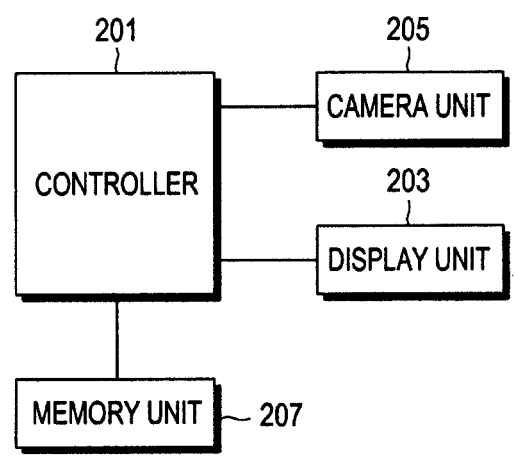
FIG. 2 is a block diagram illustrating a portable terminal according to an exemplary embodiment of the present invention.

Referring now to FIG. 2, the portable terminal shown in this particular example includes a controller 201, a display unit 203, a camera unit 205, and a memory 207.

The display unit 203 displays an image signal on a screen, and the controller 201 displays output requested data. The display unit 203 may be implemented in a touch screen display scheme, such as an electrostatic scheme or a pressure sensing scheme. The screen of the display may be constructed of a thin-film technology (TFT). In addition, the display unit 203 in this exemplary embodiment of the present invention includes a transparent display panel.

The memory 207 comprises a non-transitory machine readable medium and may include a program memory and a data memory. The program memory stores a booting system and an Operating System (OS) for controlling a general operation of the portable terminal that is loaded into hardware such as a processor or microprocessor for execution, and the data memory stores various data generated during the operation of the portable terminal.

The camera unit 205 generates an image by photographing an image of a subject for photography and outputs the generated image to the controller 201. The camera unit may include, for example, an active pixel sensor (APS), or a charge-coupled device (CCD), or any other type of optical sensor to obtain an image. More particularly, the camera unit 205 preferably is comprised of a plurality of cameras (such as a first camera and preferably at least a second camera). The first camera from among the plurality of cameras is positioned in a front surface of the portable terminal and photographs a subject for photography located in front of the front surface. The second camera from among the plurality of cameras is positioned in a rear surface of the portable terminal and photographs a subject for photography located in front of the rear surface.

When a user is positioned in front of the front side of the portable terminal, the first camera automatically photographs the user and generates a first image including a shape of the user (i.e. user/operator of the camera), and the second camera generates a second image including a shape of a subject for photography positioned in front of the rear surface. The camera unit 205 outputs the generated first and second images to the controller 201. In other words, the user (user) is not knowingly taking his own picture, rather the camera itself captures the image of the user in order to determine a view angle 313 of the user to the actual subject that is desired to be photographed and analyze in view of the camera's own viewing angle 311 of the desired object to be photographed. Thus, at least two images are photographed (user and actual object) from a single request to capture an image of an object.

The controller 201, which is comprised of hardware such as a processor or microprocessor, is configured to control a general operation of the portable terminal 201.

For example, the controller 201 identifies whether the shape of the user included in the first image is located within a pre-designated area. When the shape of the user included in the first image is not located within the pre-designated area as a result of the identification, the controller 201 controls a display of the second image by adjusting a transverse size according to a view angle and a view direction of the user and controls a display of a message requesting an adjustment of the view angle, or rotates the second camera according to a view angle and a view direction of the user. The latter rotating of the second camera can occur automatically as a changeable default operation of the camera.

Here, the pre-designated area refers to an area including a predetermined scope about a center part of the first image.

Figure 3:
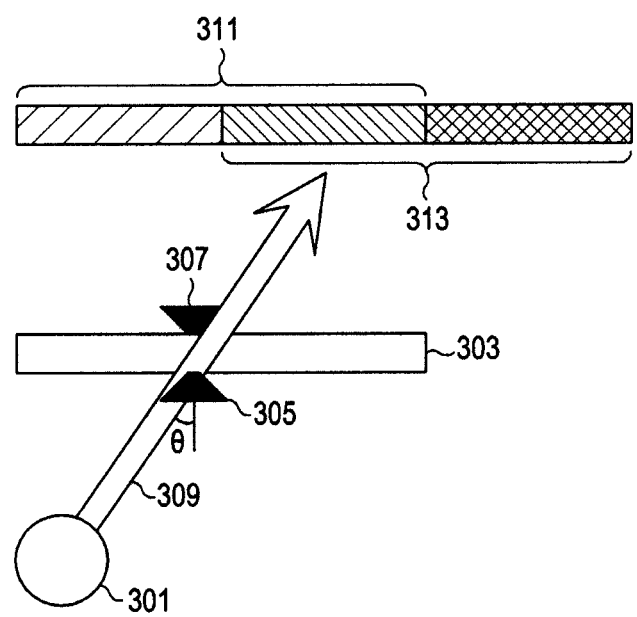
FIG. 3 is a diagram illustrating a camera view area in a portable terminal according to a first exemplary embodiment of the present invention.
Figure 4:
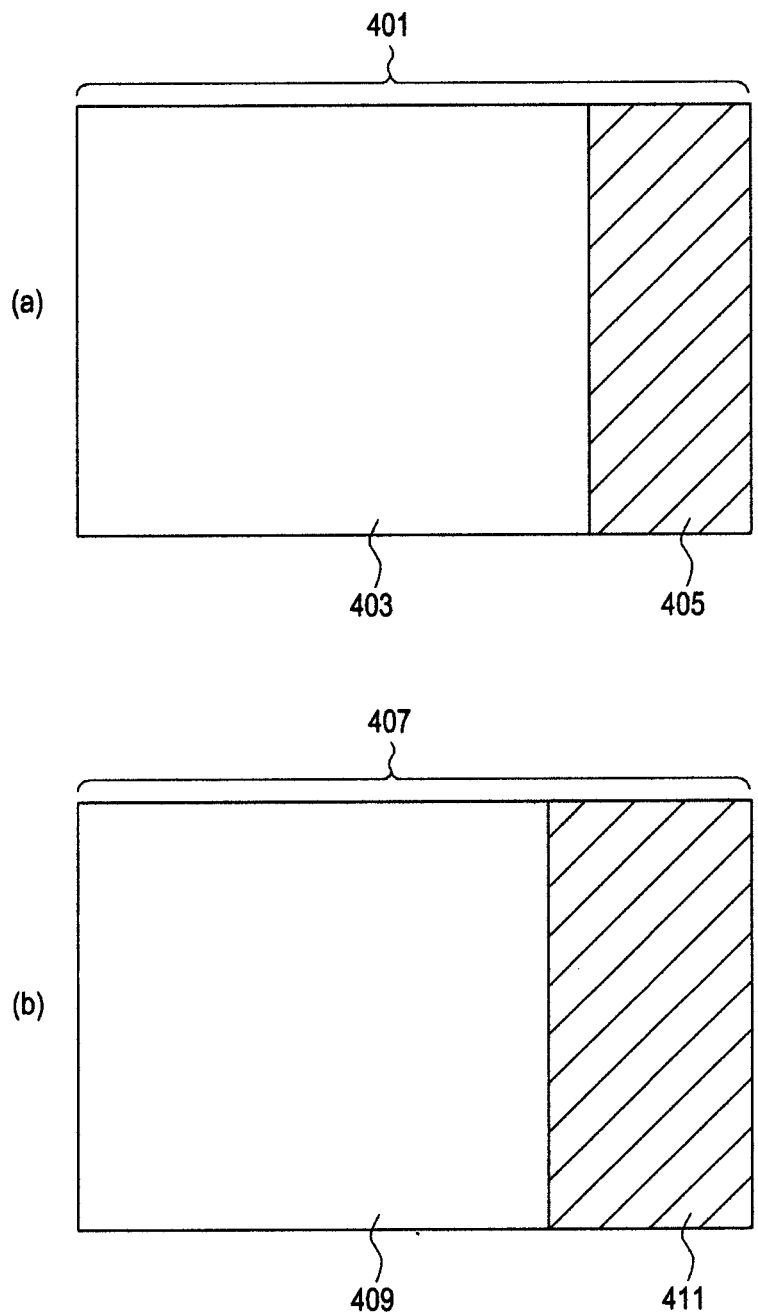
FIG. 4 is a diagram illustrating a camera view area displayed in a display unit of a portable terminal according to a first exemplary embodiment of the present invention.

FIG. 3 is a diagram illustrating a camera view area in a portable terminal according to a first embodiment of the present invention, and FIG. 4 is a diagram illustrating a camera view area displayed in the display unit of the portable terminal according to the first embodiment of the present invention.

A method of displaying a camera view area by the portable terminal will be now described with reference to FIGS. 3 and 4.

Referring now to FIG. 3, a first camera 305 is attached to a front surface of a transparent display panel 303 and a second camera 307 is attached to a rear surface of the transparent display panel 303 included in the portable terminal.

When a user 301 views the transparent display panel 303 in a view direction 309, the viewpoint of user 301 in this particular example comprises a subject for photography identified as a second area 313, projected on the transparent display panel 303. Here, the second area 313 refers to an area positioned in the view direction 309 of the user 301.

In this case, when the user 301 requests a photography, the second camera 307 photographs a first area 311 that is the view of the second camera, rather than the second area 313, which is the view of the user 301. As such, since an image projected on the transparent display panel 303 is different from an image photographed by the second camera 307, the user (user) 301 cannot photograph a desired image.

Accordingly to an exemplary aspect of the present invention, when the user 301 desires actuating the camera to take a photograph, the portable terminal provides the user 301 with an image to be photographed by the second camera 307 in advance of capturing the image such that the user 301 is provided with a preview of a desired image and thus the portable terminal provides an opportunity to change a position of the camera to photograph an image as desired. The opportunity may occur as a prompt or merely by the appearance in a camera preview image.

More particularly, when the user 301 requests the photography, the camera unit 205 receives a first image from the first camera 305, and in conjunction with the controller analyzes the first image to identify a location of the shape of the user 301 within the first image. In this case, the controller 201 may identify the position of the shape of the user 301 by using, for example, a face recognition technique.

Then, the controller 201 identifies whether or not the position of the shape of the user 301 is located within a pre-designated area of the first image. Here, the pre-designated area refers to an area including a predetermined scope about a center part of the first image.

When the position of the shape of the user 301 is identified as being within the pre-designated area of the first image as a result of the identification, the controller 201 receives a second image to be photographed through the second camera 307 from the second camera 307 and outputs the second image through the display unit 203 without adjusting a size of the received second image.

However, when the position of the shape of the user 301 is not within the pre-designated area of the first image, i.e. the image is within another area, the controller calculates a view angle of the user 301 according to the first image. Here, the view angle refers to an angle θ of a movement from a photography direction of the first camera to a view direction of the shape of the user 301. The photography direction of the first camera refers to a direction orthogonal to the transparent display panel.

According to one example of how the controller can perform calculating (determining) of the view angle, the controller 201 may calculate a ratio of a transverse length of a left eye and a transverse length of a right eye of the shape of the user 301 by using a face recognition technique and determine the view direction and the view angle of the user 301 corresponding to the calculated ratio.

For example, when the ratio of the transverse length of the left eye and the transverse length of the right eye of the user 301 is determined to be 2, the controller 201 may determine the view direction of the user 301 as a right direction and the view angle as approximate 45°. For another example, when the ratio of the transverse length of the left eye and the transverse length of the right eye of the user 301 is determined to be 0.5, the controller 201 may determine the view direction of the user 301 as a left direction and the view angle as approximate 45°.

For another example of how in the present invention that the controller can perform calculating of the view angle, the memory 207 may store a view angle table representing a view angle for each number of pixels of a movement, and the controller 201 calculates a movement direction and the number of pixels of the movement when the position of the shape of the user 301 within the first image is moved to the center area of the first image, determine the movement direction as the view direction of the user 301, and determine the view angle of the user 301 corresponding to the number of pixels of the movement with reference to the view angle table. Here, the view angle table may be generated through an experiment in advance.

For example, when the entire number of transverse pixels of the first image is 400, the number of pixels of the movement is 100, and 100 pixels of the movement in the view angle table corresponds to the view angle of 30°, the controller 201 may search for the view angle of 30° corresponding to 100 pixels of the movement in the view angle table and determine the view angle of 30° as the view angle of the user 301.

Then, the controller 201 adjusts a transverse length of the second image according to the calculated view angle and then displays the second image through the display unit 205. In this case, the controller 201 may adjust the transverse length of the second image according to the calculated view angle, display the second image, of which the transverse length has been adjusted, on a surface opposite to the view direction of the user 301 between a right surface and a left surface of the transparent display panel 303, and then performs a blinding processing in a black color on the remaining area displaying no second image. An artisan understands and appreciates that the claimed invention is not limited to the above examples of how the view angle can be calculated, which were provided for illustrative purposes.

FIG. 4 is a diagram illustrating an example of a camera view area displayed in the display unit of the portable terminal according to the first exemplary embodiment of the present invention.

Referring now to FIG. 4, as shown in (a), when the view direction of the user 301 is in a rightward direction and the view angle is 30°, the controller 201 reduces a transverse length of a second image by a transverse length corresponding to the view angle of 30°. Then, the controller 201 generates a camera view area on a left surface of a transparent display panel 401, displays the second image 403 with a reduced transverse length on the generated camera view area, and performs a blind processing on the remaining area 405 of the transparent display panel 401. The blind processing is displaying the remaining area 405 to a predetermined color (for example, black).

Further, when the view direction of the user 301 is in a rightward direction and the view angle is 45°, as shown in (b) the controller 201 reduces the transverse length of the second image by a transverse length corresponding the view angle of 45°. In this case, the controller 201 further reduces the transverse length of the second image when the view angle is 45° in comparison with the transverse length adjusted when the view angle is 30° because when the view angle of the user becomes larger, a distance between the first area 311 and the second area 313 increases, so that the user views the subject for photography positioned in the second area 313 rather than the first area 311.

The controller 210 generates the camera view area on the left surface of the transparent display panel 407, displays the second image 409, of which the transverse length has been adjusted, on the generated camera view area, and performs the blind processing on the remaining area 411 of the transparent display panel 407.

Then, the controller 201 displays a view angle adjustment request message on the second image with the reduced transverse length in a form of a pop-up window.

Figure 5:
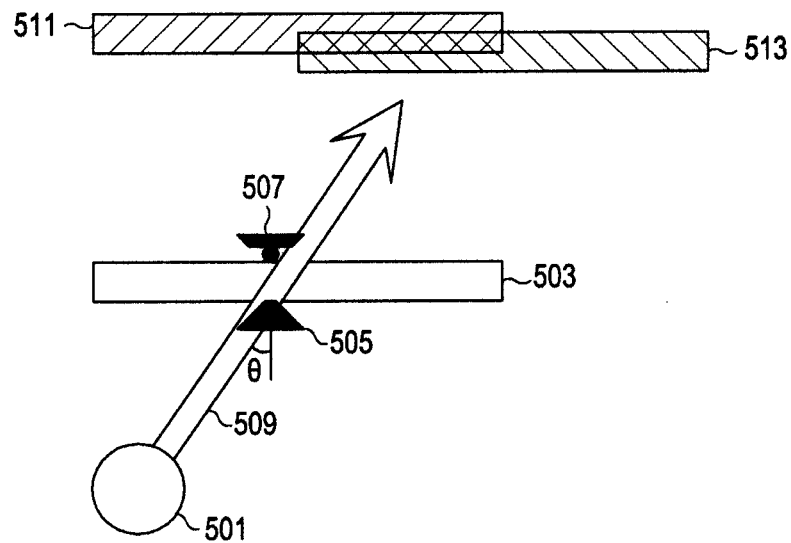
FIG. 5 is a diagram illustrating a camera view area in a portable terminal according to a second exemplary embodiment of the present invention.
Figure 6:
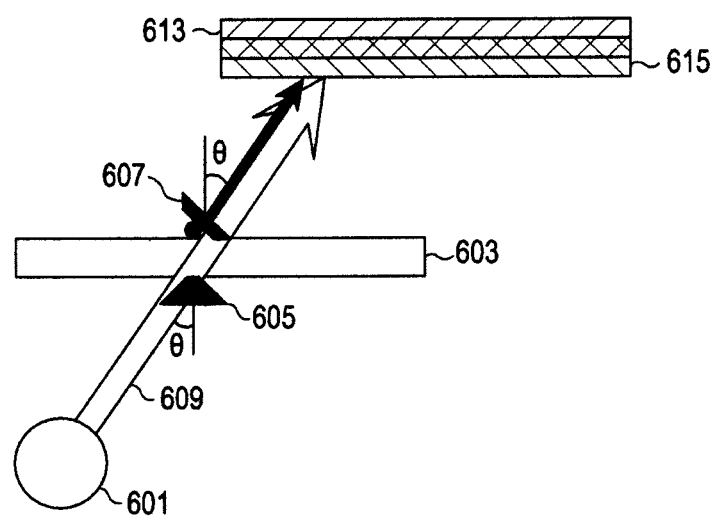
FIG. 6 is a diagram illustrating a camera view area in a portable terminal according to a second exemplary embodiment of the present invention.

FIGS. 5 and 6 are diagrams illustrating a camera view area in a portable terminal according to a second exemplary embodiment of the present invention.

A method of displaying a camera view area by the portable terminal according to the second exemplary embodiment will be now described with reference to FIGS. 5 and 6.

Referring now to FIG. 5, a first camera 505 is attached to a front surface of a transparent display panel 503 and a second camera 507 is attached to a rear surface of the transparent display panel 503 included in the portable terminal.

When a user 501 views the transparent display panel 503 in a view direction 509, the user 501 may view a subject for photography, which exists in a second area 513, projected on the transparent display panel 503. Here, the second area 513 refers to an area positioned in the view direction 509 of the user 501.

In this case, when the user 501 requests a photography, the second camera 507 of the portable terminal photographs a first area 511, and not the second area 513 viewed by the user. As such, since an image projected on the transparent display panel 503 is different from an image photographed by the second camera 507, the user 501 cannot photograph the image that he/she desires to be captured as viewed.

Accordingly, when the user 501 initiates using the camera to capture an image, the portable terminal under direction of the controller changes a photography direction of the second camera 507 to correspond to (be the same) as the view direction of the user 501 by moving the second camera 507 such that the user 301 is able to photograph a desired image.

More particularly, when the user 501 actuates the camera, the controller 201 receives a first image including a shape of the user 501 from the first camera 505 of the camera unit 205 and analyzes the first image in order to identify a location of the shape of the user 301 within the first image.

Then, the controller 201 identifies whether or not the position of the shape of the user 501 is located within a pre-designated area of the first image. Here, the pre-designated area refers to an area including a predetermined scope about a center part of the first image.

When the position of the shape of the user 501 is located within the pre-designated area of the first image, as a result of the identification, the controller 201 receives a second image photographed by the second camera 507 and outputs the received second image through the display unit 203 without adjusting a size of the received second image.

However, when the position of the shape of the user 501 does not exist (is not located) within the pre-designated area of the first image, i.e. exists in another area, the controller 201 calculates a view direction 609 and a view angle of the user 601 by using the first image.

Then, the controller 201 rotates the second camera 607 by the view angle in the view direction of the user 601 such that a photography direction 611 becomes the same as the view direction of the user 601, receives a second image captured through the rotated second camera 607, generates the camera view area on the transparent display panel 603, and outputs the received second image on the generated camera view area.

Through the aforementioned operation, the portable terminal may enable the image 615 projected on the transparent display panel 604 to be the same as the image 613 photographed through the second camera 607 in the view direction of the user 601.

Figure 7:
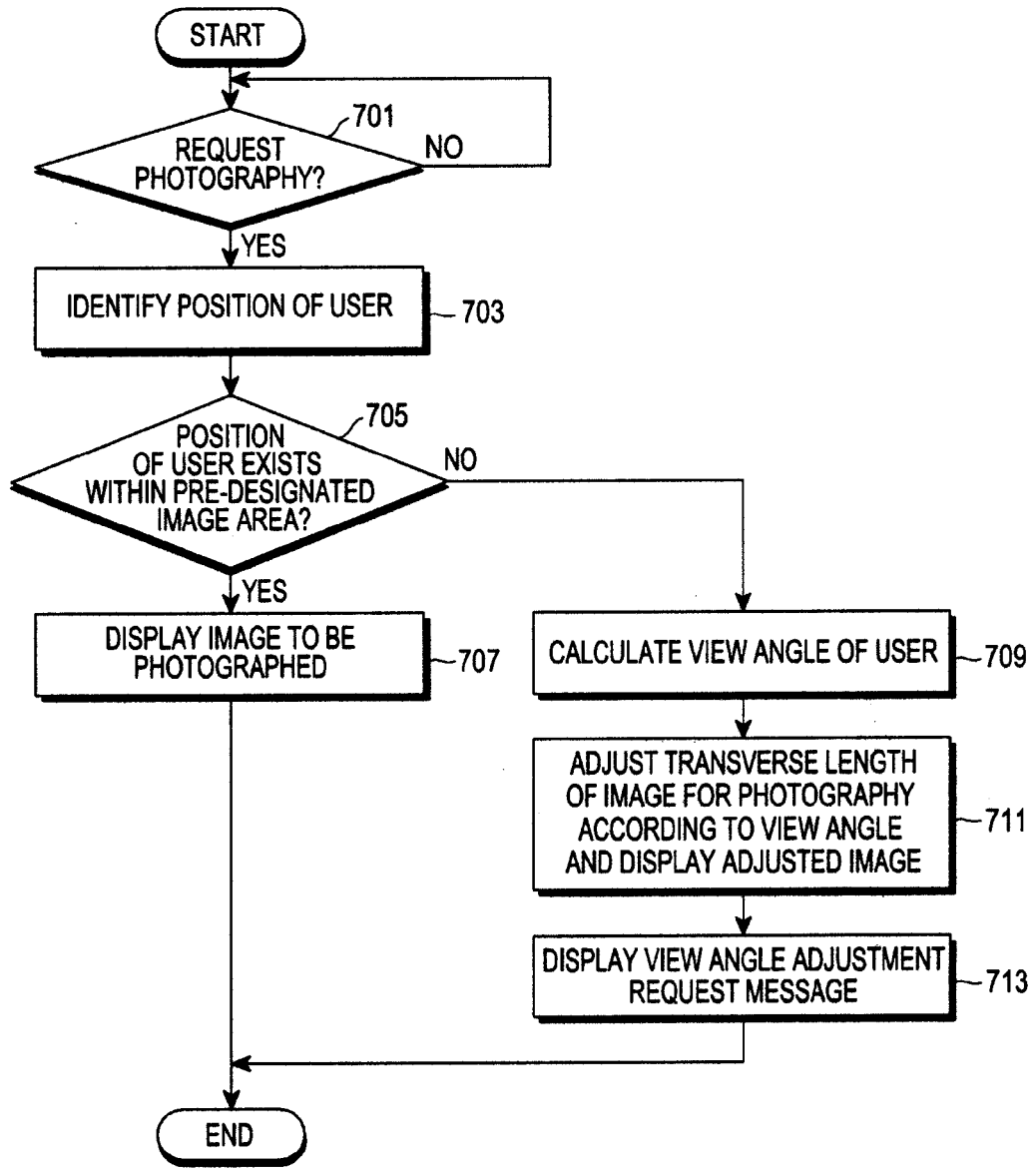
FIG. 7 is a flowchart illustrating exemplary operation a display of a camera view area in a portable terminal according to a first embodiment of the present invention.

FIG. 7 is a flowchart illustrating exemplary operation of a display of the camera view area in the portable terminal according to the first exemplary embodiment of the present invention.

Referring now to FIG. 7, the controller 201 identifies whether a request for taking a picture is received from a user in step 701. When the request for taking the picture is received, the controller 201 performs step 703, but when the request for taking the picture is not received, the controller 201 repeats step 701.

In step 703, the controller 201 identifies a position of a shape of the user by receiving a first image including the shape of the user from a first camera of the camera unit 205 and analyzes the received first image. Then, at step 705, the controller 201 may identify the position of the shape of the user 301 by using a face recognition technique. The particular face recognition technique can be a conventional face recognition technique.

Then, at step, the controller 201 identifies whether the position of the shape of the user is located within a pre-designated area of the first image in step 705. Here, the pre-designated area refers to an area including a predetermined scope about a center part of the first image.

When the position of the shape of the user is located as being within the pre-designated area as a result of the identification, the controller 201 performs step 707. However, when the position of the shape of the user is not included within the pre-designated area as a result of the identification, the controller 201 proceeds to step 709.

When the controller 201 performs step 707, the controller 201 receives a captured second image from the second camera and directly outputs the received second image through the display unit 203 without adjusting a size of the second image.

However, when the controller 201 performs step 709, the controller 201 calculates a view angle of the user according to the first image and then performs step 711. Here, the view angle refers to an angle θ of a movement from a photography direction of the first camera to a view direction of the shape of the user. The photography direction of the first camera refers to a direction orthogonal to the transparent display panel.

As a particular example of how of calculating the view angle can be performed according to the present invention, the controller 201 may calculate a ratio of a transverse length of a left eye and a transverse length of a right eye of the shape of the user by using a face recognition technique and determine the view direction and the view angle of the user 301 corresponding to the calculated ratio.

For example, when the ratio of the transverse length of the left eye and the transverse length of the right eye of the user is determined to be 2, the controller 201 may determine the view direction of the user as a right direction and the view angle as approximate 45°. For another example, when the ratio of the transverse length of the left eye and the transverse length of the right eye of the user is determined to be 0.5, the controller 201 may determine the view direction of the user as a left direction and the view angle as approximate 45°.

For another example of the view angle can be calculated according to the present invention, the memory 207 may store a view angle table representing a view angle for each number of pixels of a movement, and the controller 201 calculates a movement direction and the number of pixels of the movement when the position of the shape of the user within the first image is moved to the center area of the first image, determine the movement direction as the view direction of the user, and determine the view angle of the user corresponding to the number of pixels of the movement by using the view angle table. Here, the view angle table may be generated through an experiment.

For example, when the entire number of transverse pixels of the first image is 400, the number of pixels of the movement is 100, and 100 pixels of the movement in the view angle table corresponds to the view angle of 30°, the controller 201 may search for the view angle of 30° corresponding to 100 pixels of the movement in the view angle table and determine the view angle of 30° as the view angle of the user.

Then, according to the presently claimed invention, the controller 201 adjusts a transverse length of the second image according to the calculated view angle and then displays the second image, of which the transverse length has been adjusted, on the transparent display panel of the display unit 205 in step 711 and then performs step 713.

In this case, the controller 201 may reduce the transverse length of the second image according to the calculated view angle, display the second image, of which the transverse length has been reduced, on a surface opposite to the view direction of the user between a right surface and a left surface of the transparent display panel, and then performs a blinding processing on the remaining area displaying no second image.

Then, the controller 201 displays a view angle adjustment request message on the second image with the reduced transverse length in a form of a pop-up window in step 713.

Through the aforementioned operation, the portable terminal including the transparent display panel notifies the user that an image desired by the user is different from an image photographed by the camera by adjusting a size of the image photographed by the camera according to the view angle of the user.

Figure 8:
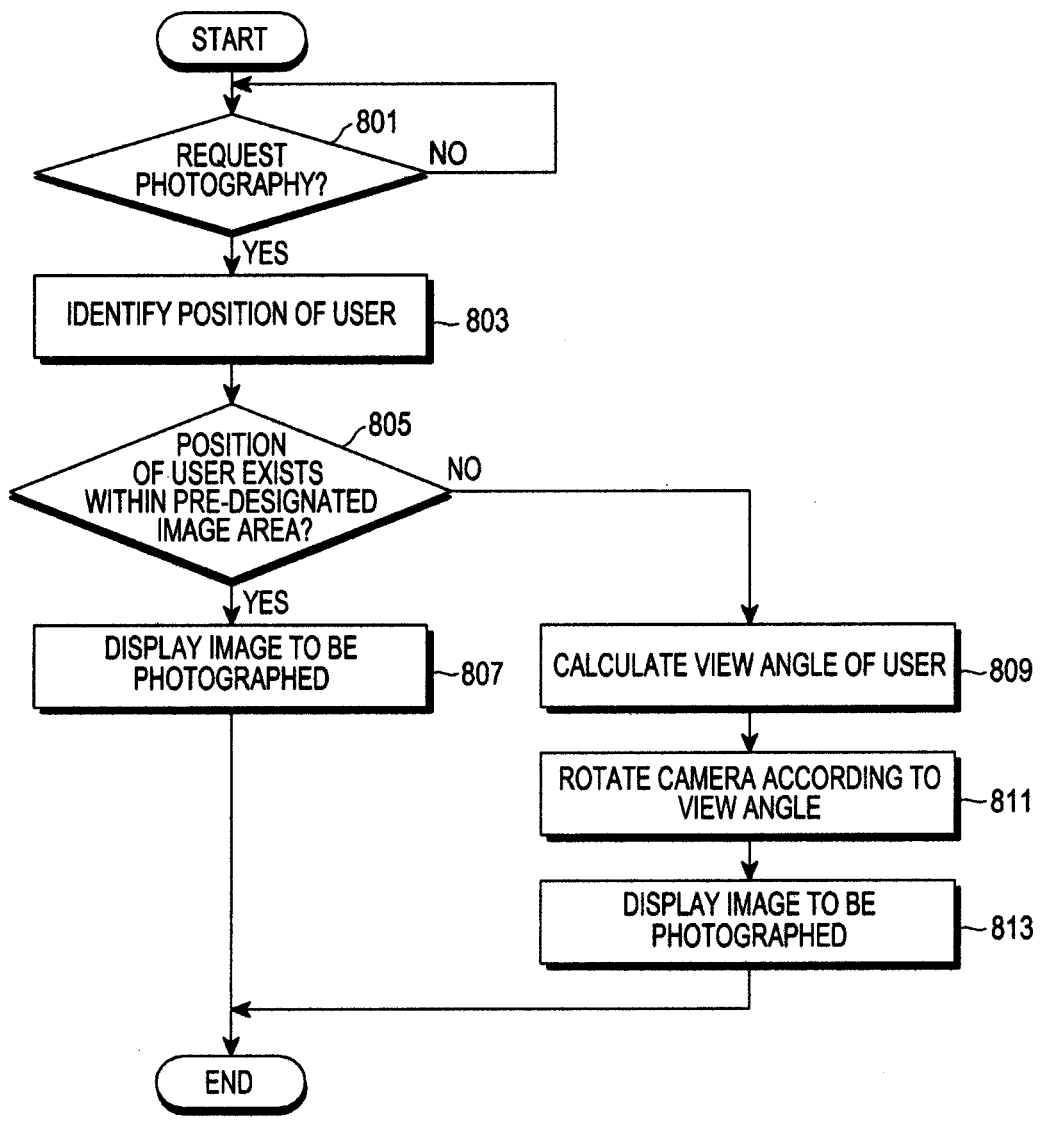
FIG. 8 is a flowchart illustrating exemplary operation a display of a camera view area in a portable terminal according to a second embodiment of the present invention.

FIG. 8 is a flowchart illustrating a display of the camera view area in the portable terminal according to the second exemplary embodiment of the present invention.

Referring now to FIG. 8, at step (801) the controller 201 identifies whether a request for taking a picture is received (from the user). When the request for taking the picture is received, as a result of the identification, the controller 201 performs step 803. However, when the request for taking the picture is not received from the user as a result of the identification, the controller 201 repeats step 801.

When the controller 201 performs step 803, the controller 201 identifies a position of the shape of the user within the first image by receiving a first image including a shape of the user from the first camera of the camera unit 205 and analyzing the first image, and then proceeds to perform step 805.

Then, at step 805, the controller 201 identifies whether or not the position of the shape of the user exists within a pre-designated area of the first image. Here, the pre-designated area refers to an area including a predetermined scope about a center part of the first image.

When the position of the shape of the user exists within the pre-designated area as a result of the identification, the controller 201 then performs step 807. However, when the position of the shape of the user does not exist within the pre-designated area as a result of the identification, the controller 201 performs step 809.

At step 807, the controller 201 receives a photographed second image from the second camera 507 and directly outputs the received second image on the transparent display panel of the display unit 203 without adjusting a size of the second image.

In contrast to step 807, the controller 201 at step 809 calculates a view direction and a view angle of the user by using the first image, and then performs step 811. In this case, the controller 201 may calculate the view angle by using any example from among the examples described in step 705 of FIG. 7.

Then, at step 811, the controller 201 rotates the second camera by the view angle in the view direction of the user such that the second camera has the same photography direction 611 as the view direction of the user, receives the photographed second image through the rotated second camera, generates the camera view area on the transparent display panel of the display unit 205, and outputs the received second image on the generated camera view area.

Through the aforementioned operation, the portable terminal may make the image projected on the transparent display pane in the view direction of the user be the same as the image captured by the second camera.

As described above, the portable terminal including the transparent display panel has an effect of making an image desired by the user be the same as an image actually photographed by the camera by rotating the camera according to the view direction and the view angle of the user.

The above-described methods according to the present invention and the appended claims comprise statutory subject matter in compliance with 35 U.S.C. §101 and can be implemented in hardware, firmware or as software or computer code that can be stored in a recording medium such as a CD ROM, an RAM, a floppy disk, a hard disk, thumbnail drive or a magneto-optical disk or computer code downloaded over a network originally stored on a remote recording medium or a non-transitory machine readable medium and to be stored on a local non-transitory recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. None of the claimed elements of the appended claims are directed to software per se.

While the present invention has been shown and described with reference to certain exemplary embodiments and drawings thereof, it will be understood by those skilled in the art that various changes in form and details may be made therein without departing from the spirit and scope of the invention as defined by the appended claims.

What is claimed is:

1. An apparatus for displaying a camera view area in a portable terminal, the apparatus comprising:
    a display unit comprising a transparent display panel;
    a camera unit including a first camera on a first side of the display unit and a second camera on a second side of the display unit, the first side and the second side of the display unit are directly opposite from each other and the second camera is rotatable to adjust an optical axis to a desired view;
    a controller for receiving a first image captured by the first camera, identifying a position of a user by analyzing the first image, determining a view direction of the user based on the identified position of the user, and rotating the second camera to adjust the optical axis based on the view direction of the user for photographing in the view direction of the user by the second camera.

2. The apparatus as recited in claim 1, wherein the controller is configured to control the first camera to automatically photograph the user as the first image in order to determine a view direction of the user in response to a request to capture a second image by the second camera.

3. The apparatus as recited in claim 1, wherein the controller receives a second image from the rotated second camera, generates the camera view area on the transparent display panel, and outputs the second image on the generated camera view area.

4. The apparatus as recited in claim 1, wherein the controller identifies from the first image the position of a shape of the user by using a face recognition technique.

5. The apparatus as recited in claim 1, wherein the controller rotates the second camera according to a calculated view angle in the determined view direction of the user.

6. The apparatus as recited in claim 1, wherein the controller is configured to output a preview of a desired second image as originally viewed by the second camera prior to rotating the second camera.

7. The apparatus as recited in claim 1, wherein the controller prompts as to whether or not to change a position of the camera prior to photographing a desired second image prior to rotating the second camera based on a calculated view angle and the determined view direction of the user.

8. The apparatus as recited in claim 1, wherein the controller is configured for controlling an adjustment of a transverse length of a second image to capture the second image according to a view direction of the user.

9. A method of displaying a camera view area in a portable terminal, the method comprising:
receiving a first image automatically captured by a first camera on a first side of a display unit of the portable terminal including a shape of a user in response to receiving a request for taking a picture of a second image by a second camera on a second side of the display unit directly opposite the first camera;
identifying by a controller a position of the shape of the user within the first image;
determining by the controller whether the identified position of the shape of the user is included within in a pre-designated area;
determining by the controller whether a view direction of the user according to the shape of the user when the identified position of the shape of the user is not included in the pre-designated area as a result of the determination; and
rotating a second camera to adjust an optical axis for photographing the second image based on the determined view direction of the user.

10. The method according to claim 9, wherein the receiving a first image includes generating the first camera to automatically photograph the user as the first image in order to determine a view direction of the user in response to a single request to capture the second image by the second camera.

11. The method according to claim 9, further comprising:
capturing of the second image from the second camera in a view direction that corresponds the view direction of the user.

12. The method according to claim 9, wherein determining whether the identified position of the shape of the user is included within in a pre-designated area includes determining to whether or not to change a position of the second camera prior to photographing a desired second image prior to rotating the second camera based on the determined view direction and a calculated view angle.

13. The method as recited in claim 9, further comprising:
receiving the second image from the rotated second camera;
generating the camera view area on a transparent display panel of the display unit; and
outputting the second image on the generated camera view area.

14. The method as recited in claim 9, wherein identifying of the position of the shape of the user includes identifying the position of the shape of the user by using a face recognition technique.

15. The method as recited in claim 9, wherein rotating of the second camera includes rotating the second camera by a calculated view angle in the determined view direction.

16. The method as claimed in claim 9, wherein the first camera is included in a front surface of the portable terminal and the second camera is included in a rear surface of the portable terminal.

* * * * *